Oct. 2, 1956     F. E. BUELL     2,764,847
BURN-OFF METHOD
Filed May 7, 1952     3 Sheets-Sheet 3
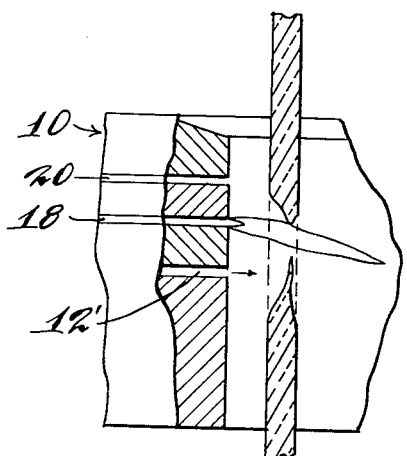
FIG-9-
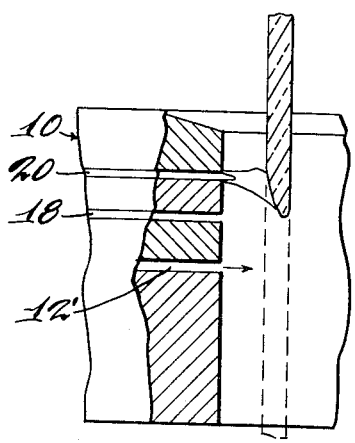
FIG-10-
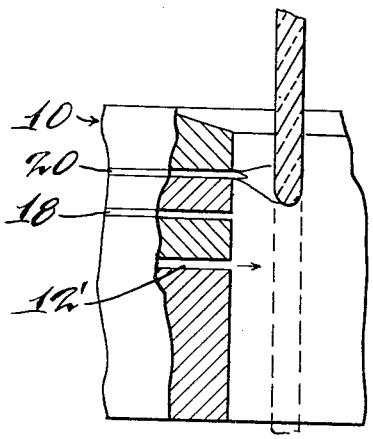
FIG-11-
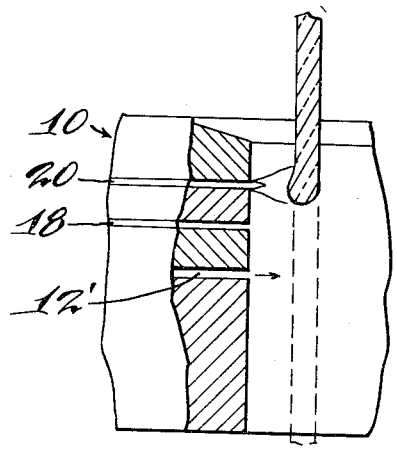
FIG-12-
INVENTOR:
FLOYD E. BUELL.
BY
Rule & Hoge,
ATTYS United States Patent Office 2,764,847
Patented Oct. 2, 1956

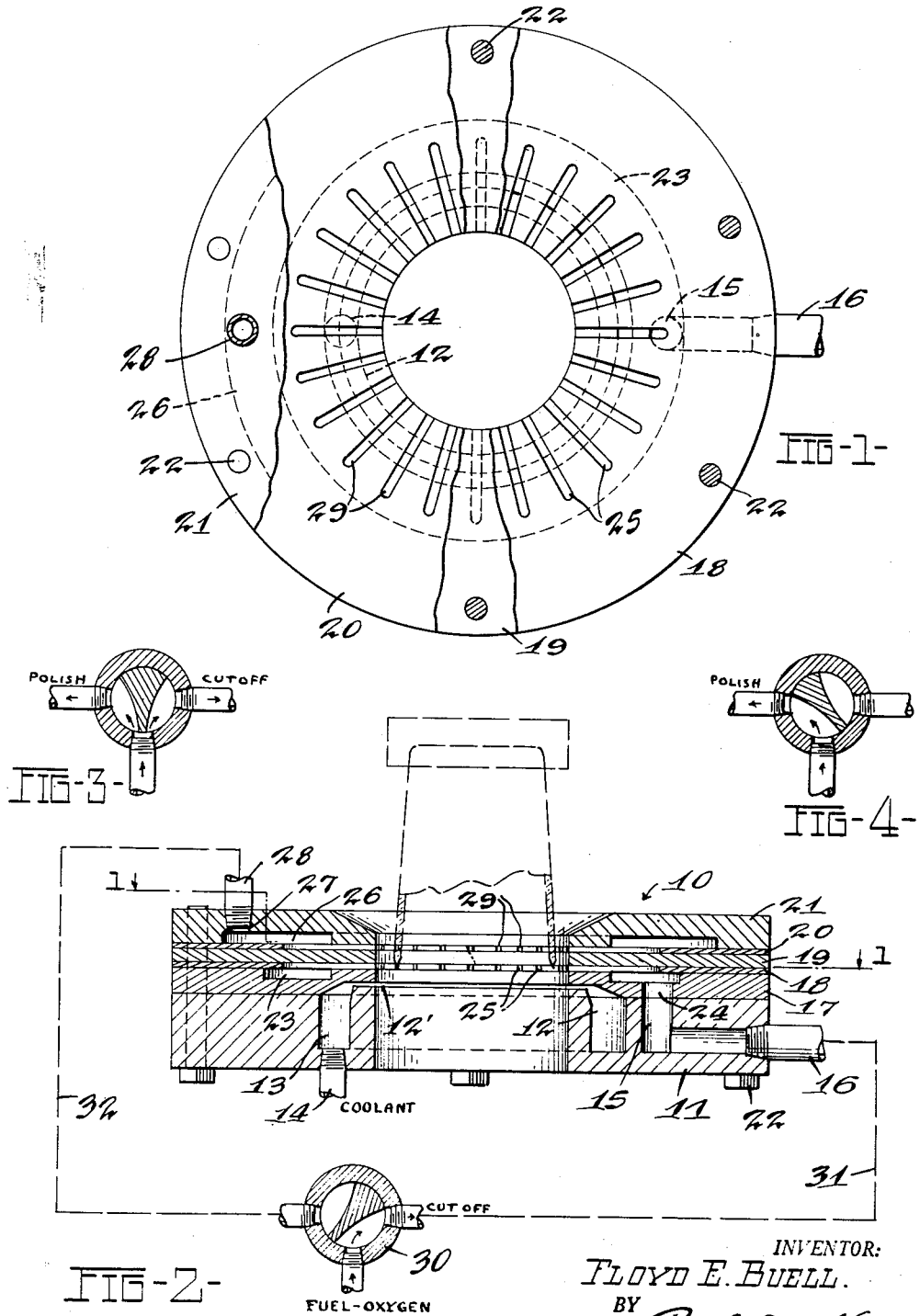

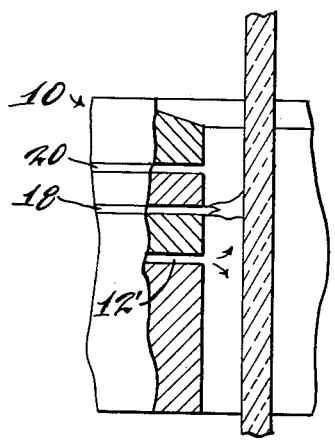
FIG-5-
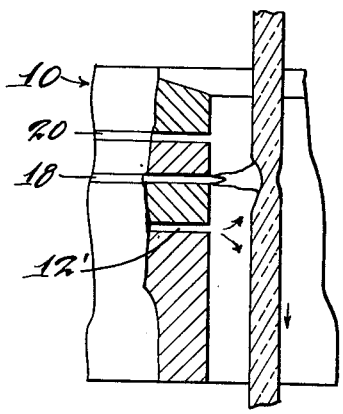
FIG-6-
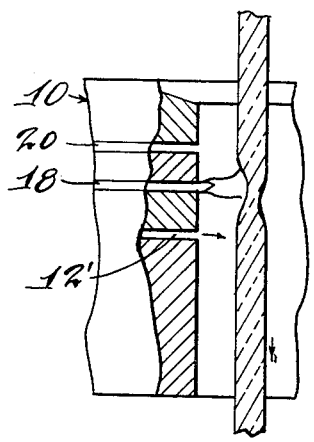
FIG-7-
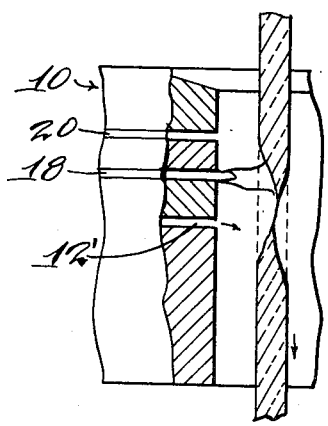
FIG-8-

2,764,847
BURN-OFF METHOD

Floyd E. Buell, Toledo, Ohio, assignor to Owens-Illinois Glass Company, a corporation of Ohio Application May 7, 1952, Serial No. 286,531

3 Claims. (Cl. 49—77)

This invention relates to severing the moil or waste material from hollow glass articles and particularly to a new method for severing the moil and subsequently forming a bead on the edge of the articles.

The process of severing the moil and subsequently forming a bead on the edge of an article is known in the art as burning off. This process involves certain inherent difficulties because of the nature of the material, namely the glass. In severing the moil it is difficult to obtain simultaneous separation of the glass around the circumference of the article. In every instance the glass is drawn out into a thread at one or more points prior to complete separation. After severing, this thread returns to the edge due to the surface tension of the glass and forms a lump or uneveness on the edge of the article. This lump becomes an unsightly defect on the finished article.

In addition, in all the prior art methods of burning off it has been found to be extremely difficult to control or adjust the size of the bead which is formed on the edge of the article after the severing operation.

It is therefore an object of this invention to provide a method of burning off hollow glass articles wherein the resultant edge is uniform and the bead on the edge is of controlled size.

Other objects of the invention will appear hereinafter.

Basically my improved method comprises a two-step process of burning off. First, a flame is applied to a localized region of the workpiece, which is rotated about a vertical axis, with the article portion of the workpiece in superposed relation to the moil portion. A cooling fluid is simultaneously applied to a localized region of the moil portion of the workpiece adjacent to the flame. Application of the flame and cooling fluid is continued until the moil is severed from the article. Second, a flame is applied to a localized area of the article above the edge of the article to form the bead.

Referring to the accompanying drawings:

Fig. 1 is a part sectional plan view of the burner at the line 1—1 on Fig. 2;

Fig. 2 is a sectional view of a burner which may be used in conjunction with my invention together with a schematic representation of the supply lines for fuel and cooling fluid;

Fig. 3 is a sectional view of a valve showing the position of the valve when the fuel is being applied to both burner sections of the burner;

Fig. 4 is a sectional view of the valve showing the position of the valve when the fuel is being applied to the polishing burner section of the burner;

Fig. 5 is a fragmentary sectional view showing the relationship of the glass workpiece and the burner at the beginning of the severing operation;

Figs. 6 and 7 are views similar to Fig. 5 showing the stretching of the wall of the glass workpiece during the application of the severing flame;

Figs. 8 and 9 are similar views showing the relationship of the workpiece to the burner at the severing;

Figs. 10, 11, and 12 indicate the relationship of the article and the burner during the formation of the bead.

Referring to Figs. 1 and 2, a burner 10, which may be utilized in this invention, is constructed to apply two flames and a cooling fluid to localized regions of the glass workpiece as subsequently described.

As shown in Fig. 2, the burner includes an annular or ring-like base 11 having a central opening into which an article of glassware is inserted. The base 11 is provided with an annular groove 12 in the upper surface thereof adjacent to the central opening. A channel 13 extends from the groove 12 through the base 11 to an inlet pipe 14 for a source of cooling fluid such as air. A channel 15 extends from the upper surface of the base 11 to a fuel oxygen mixture inlet pipe 16.

The burner also includes a lower manifold 17, a cut-off burner shim 18, a spacer 19, a polishing burner shim 20, and an upper manifold 21, all held in superposed relationship by screws 22.

The bottom surface of the manifold 17 overlies the annular groove 12 and forms an annular slit 12' surrounding the central opening. Cooling fluid enters through inlet 14 and channel 13 to the groove 12 and then out of the slit 12'.

The lower manifold is also provided with an annular groove 23 in the upper surface thereof and an opening 24 extending from the groove 23 into register with the channel 15 in the base 11.

Fuel oxygen mixture entering through inlet 16 passes through channel 15 and opening 24 and then to the groove 23 onto the burner shim. The shim 18 is provided with radial slots 25 which direct the flame towards the central opening.

The upper manifold 21 is provided with an annular groove 26 in the lower surface thereof. A passageway 27 extends from the groove 26 to fuel oxygen mixture inlet 28 on the upper surface of the manifold. Fuel passes through the inlet 28 to passageway 27 and then to groove 26 onto the polishing burner shim 20. The polishing burner shim 20 is provided with radial slots 29 adjacent to the annular groove 26 for directing the flame inwardly towards the central opening. The spacer 19 serves to separate the shims 18 and 20.

Provision may be made for supplying the fuel to the burner sections either alternately or simultaneously. For example (as shown in Fig. 2) a two-way valve 30 may be connected to the cut-off burner inlet 16 by line 31 and the polishing burner inlet 28 by line 32. With the valve in the position shown in Fig. 2, the fuel oxygen mixture is being applied to the lower or cut-off burner section. With the valve in position shown in Fig. 3, the fuel oxygen mixture is being applied simultaneously to both the cut-off and polishing sections of the burner. With the valve in the position shown in Fig. 4, the fuel oxygen mixture is being applied to the polishing section of the burner.

Referring to Fig. 2, the glass workpiece is shown in its relative relationship to the burner at the beginning of the burning off operation. As shown, the article portion of the workpiece is in superposed relation to the moil portion. The entire workpiece is supported from the top or article end and rotated about its vertical axis. At the beginning of the burn-off operation the flame emanates from the cut-off burner shim 18 and is applied to a localized region of the workpiece. Simultaneously a cooling fluid such as air is applied to the localized region of the workpiece adjacent to the flame (Fig. 5). This application of flame and cooling fluid is continued and as the glass is softened, the weight of the moil causes the localized area to elongate or thin out. The cooling fluid serves to cool the area on the moil side of the workpiece thus restricting the area which is being softened, In addition, if the cooling fluid is air, it serves to supply secondary oxygen to the cut-off flame. With continued application of the severing flame and cooling fluid the moil is finally severed from the article (Figs. 8 and 9).

After severing of the moil, the rotation of the article is continued and a polishing flame emanating from the upper or polishing section of the burner is applied to a localized region of the article above the severed edge of the article (Fig. 10). Application of this flame is continued until the desired bead is formed (Figs. 11 and 12).

I have determined that the size of the bead may be controlled by adjusting the vertical distance between the polishing flame and the edge of the article. This may be accomplished by replacing the shim 19 with a shim of different thickness. If the distance between the flame and the edge is greater, the resultant bead is larger.

I have also determined that it is preferable to adjust the vertical distance between the severing flame and the cooling fluid in order to have the minimum amount of softened glass at the line of separation. This permits or results in an elimination, for all practical purposes, of the lump on the edge of the article due to the thread at the last point of separation. As shown in Fig. 9, this results in an edge at severance which has a negative roll or thickness.

The term negative roll as used herein is intended to indicate that the edge has a thickness less than the original thickness of the glass article; the term positive roll being used to indicate a thickness greater than the original thickness.

After severing the moil from the glass article and producing a negative roll on the edge of the article, the desired bead is applied by the second step comprising my method, namely, the application of a flame above the edge of the article.

It is thus apparent that my improved method not only results in the elimination of the lump on the edge of the article, but also permits the formation of a controlled bead or roll on the edge of the article.

It is within the scope of my invention to utilize a single flame and shift the article with respect to the flame, after severing the moil, in order to form the bead; or shift the flame relative to the article to form the bead.

However, it is preferred to utilize a burner having two burner sections since such an arrangement eliminates complicated mechanical devices for shifting the article or the burner. In addition, in a burner having two burner sections, it is possible to provide one flame of the desired properties for severing or cutting glass, and another flame of the desired properties for polishing glass.

Modifications may be resorted to within the spirit and scope of the appended claims.

I claim:

1. In the burning off of hollow glassware wherein the workpiece has an article portion and a moil portion, the method which comprises rotating the workpiece about its axis, applying a first flame to a localized region extending around the workpiece thereby softening the glass in said localized region, simultaneously applying a cooling fluid to a localized region extending around the workpiece and adjacent to said flame on the moil side of the work piece, continuing the application of the flame and the cooling fluid until the moil is severed from the article, and thereafter applying a second flame to a localized region extending around the article adjacent the severed edge of the article while maintaining the initial position of the article, and continuing the rotation of the article during the application of the second flame, thereby forming the desired bead on the edge of the article.

2. In the burning off of hollow glassware wherein the workpiece has an article portion and a moil portion, the method which comprises rotating the workpiece about a vertical axis with the article portion above the moil portion, applying a first flame to a localized region extending horizontally around the workpiece thereby softening the glass in said localized region, simultaneously applying a cooling fluid to a localized region extending horizontally around the workpiece and adjacent to said flame on the moil side of the workpiece, continuing the application of the flame and cooling fluid to sever said moil portion from the article portion, thereafter applying a second flame to a localized region extending horizontally around the article above the severed edge of the article while maintaining the initial position of the article, and continuing the rotation of the article during the application of the second flame, thereby forming the desired bead on the edge of the article.

3. In the burning off of hollow glassware wherein the workpiece has an article portion and a moil portion, the method which comprises rotating the workpiece about a vertical axis with the article portion above the moil portion, surrounding the article by a ring of flame applied to the surface of the workpiece thereby softening the glass in a localized region, simultaneously surrounding the workpiece by a ring of cooling fluid applied to the surface of the workpiece adjacent said ring of flame on the moil side of the workpiece, continuing the application of the flame and the cooling fluid until the moil portion is severed from the article portion, thereafter applying a second flame to a localized region extending horizontally around the article above the severed edge of the article while maintaining the initial position of the article, and continuing the rotation of the article during the application of said second flame, thereby forming the desired bead on the edge of the article.

References Cited in the file of this patent

UNITED STATES PATENTS

| Number | Name | Date |
|---|---|---|
| 1,577,538 | Parker | Mar. 23, 1926 |
| 2,005,308 | Anderson | June 18, 1935 |
| 2,381,467 | Schutz | Aug. 7, 1945 |
| 2,435,638 | Shorter | Feb. 10, 1948 |
| 2,439,754 | Schutz | Apr. 13, 1948 |
| 2,548,743 | Schreiber | Apr. 10, 1951 |
| 2,570,899 | Wolf | Oct. 9, 1951 |